United States Patent [19]

Scozzari

[11] 4,199,668
[45] Apr. 22, 1980

[54] CIRCUIT ARRANGEMENT FOR SIGNAL EQUALIZATION IN WIDE-BAND TRANSMISSION SYSTEM

[75] Inventor: Giuseppe Scozzari, Milan, Italy

[73] Assignee: Societa Italiana Telecomunicazioni Siemens S.p.A., Milan, Italy

[21] Appl. No.: 937,814

[22] Filed: Aug. 29, 1978

[30] Foreign Application Priority Data

Sep. 1, 1977 [IT] Italy ............................ 27175 A/77

[51] Int. Cl.$^2$ .................. H03H 7/36; H04B 3/04; H04B 3/46
[52] U.S. Cl. .................. 179/175.3 R; 333/18; 455/63; 455/67
[58] Field of Search .................. 179/175.3 R, 15 BF, 179/15 FD; 333/18, 28 R; 325/42, 65; 178/66; 235/152; 328/162, 163, 155

[56] References Cited

U.S. PATENT DOCUMENTS

| | | | |
|---|---|---|---|
| 3,550,005 | 12/1970 | Whang | 325/65 |
| 3,566,271 | 2/1971 | Whang et al. | 333/18 |
| 3,573,667 | 4/1971 | Kao et al. | 333/18 |
| 3,670,269 | 6/1972 | Starr et al. | 333/18 |
| 3,742,360 | 6/1973 | Ragsdale | 333/18 |
| 3,798,576 | 3/1974 | Torpie | 333/18 |
| 4,063,183 | 12/1977 | Evans | 333/18 |

Primary Examiner—Thomas A. Robinson
Attorney, Agent, or Firm—Karl F. Ross

[57] ABSTRACT

A transmitting station for wide-band signals at one end of a line such as a bifilar or quadrifilar cable includes a generator of test frequencies lying between several sub-bands—such as carrier-frequency telephone channels—normally used for message transmission. A pilot wave outside the range of message frequencies, generated at the transmission station, is modulated under the control of a transmitting-side programmer to indicate the start of a test sequence during which the several test frequencies are sequentially emitted, except when a message to be transmitted (e.g. a TV program) spans several sub-bands and requires suppression of the intervening test frequencies. At the other end of the line, a receiving station includes an equalizer with a number of individually adjustable stages pertaining to respective frequency bands centered on the several test frequencies. A receiving-side programmer, started by the extracted pilot wave, controls a generator of heterodyning frequencies which differ by a predetermined beat frequency from the respective test frequencies and are sequentially produced for mixing with the incoming test frequencies. The amplitude of the resulting beat frequency is detected and compared with a reference voltage to generate an error signal which is fed to a storage cell of a memory working into the corresponding equalizer stage for adjusting same until the error signal disappears. If the transmitting-side programmer is instructed to skip one or more test frequencies, their absence is communicated by the beat-frequency detector to the receiving-side programmer which then switches immediately to another heterodyning frequency.

6 Claims, 3 Drawing Figures

CIRCUIT ARRANGEMENT FOR SIGNAL EQUALIZATION IN WIDE-BAND TRANSMISSION SYSTEM

FIELD OF THE INVENTION

My present invention relates to a signal equalizer for a telecommunication system in which a transmission line such as a bifilar or coaxial cable carries message signals of large bandwidth from a transmitting station to a receiving station.

BACKGROUND OF THE INVENTION

In such a telecommunication system, the need for an equalizer arises from the different attenuation undergone by signals in different regions of the overall frequency range. That attenuation, furthermore, also varies seasonally with temperature changes affecting the transmission parameters of the line itself as well as the gain of amplifiers in repeaters along the line.

Conventional equalizers are divided into a multiplicity of stages which are individually adjustable to correct the signal level in respective frequency bands. For the adjustment of such equalizer stages it is known to send respective test frequencies over the line, these test frequencies generally lying between sub-bands used for the transmission of message signals. In long-distance telephony, for example, these sub-bands represent a multiplicity of voice channels transposed onto different carrier frequencies, with the test frequencies lying in interstitial zones separating the channels.

Situations may arise in which one or more interstitial zones are temporarily utilized for the transmission of message signals so that the test frequencies assigned to these zones cannot be sent. A case in point is the transmission of a television program over a telephone cable, the large bandwidth of the video signals requiring the simultaneous use of several voice channels for this purpose.

OBJECTS OF THE INVENTION

The general object of my present invention is to provide an efficient circuit arrangement for automatically adjusting the equalizer stages of a wide-band telecommunication system, in response to test frequencies sent from time to time over a transmission line, without interfering with the transmission of message signals over the same line.

A more particular object is to provide means in such a circuit arrangement for selectively modifying the pattern of test frequencies if, for one reason or another, certain of these frequencies cannot be utilized.

SUMMARY OF THE INVENTION

In accordance with my present invention, a first oscillation generator at the transmitting end of the line is actuatable by a first programmer to emit these test frequencies over the line in a predetermined sequence while a second oscillation generator at the receiving end of the line is similarly actuatable by a second programmer to produce a succession of heterodyning frequencies each differing from a respective test frequency by a predetermined beat frequency $\Delta f$. With the two programmers suitably synchronized, a mixer with input connections to the transmission line (at a point downstream of a multistage equalizer to be adjusted) and to the second oscillation generator produces the beat frequency $\Delta f$ upon coincidence of an arriving test frequency with the corresponding heterodyning frequency. A detector connected to the mixer output produces a test signal which is proportional to the amplitude of the beat frequency and, therefore, also to that of the arriving test frequency; a comparison of this test signal with a predetermined reference signal yields a corrective signal which is then fed back to the corresponding equalizer stage for readjusting same until the difference between the test signal and the reference signal disappears. Advantageously, the feedback path includes a memory with cells respectively assigned to the several equalizer stages for storing control quantities modified by the corrective signals.

The synchronization of the two programmers can be performed, according to another feature of my invention, with the aid of a signal emitter at the transmitting end actuatable by the first programmer to send a start signal over the line at the beginning of a test program, i.e. just prior to or substantially concurrently with the transmission of the first test frequency of the sequence. A signal extractor at the receiving end responds to the arrival of the start signal to trigger the second programmer into initiating the local generation of the succession of heterodyning frequencies. The signal emitter may comprise a pilot-wave oscillator whose operating frequency lies outside the range of message frequencies, preferably below that range.

In the event that one or more test frequencies are to be cut out, as discussed above, a further feature of my invention provides for the presence of suppressor means at the transmitting end by which the operation of the first programmer may be selectively modified to skip the unwanted test frequency or frequencies in the predetermined sequence. The second programmer, under the control of the beat-frequency detector, then modifies the succession of heterodyning frequencies in substantial conformity with the sequence of arriving test frequencies.

BRIEF DESCRIPTION OF THE DRAWING

The above and other features of my invention will now be described in detail with reference to the accompanying drawing in which.

SPECIFIC DESCRIPTION

Figure 1:
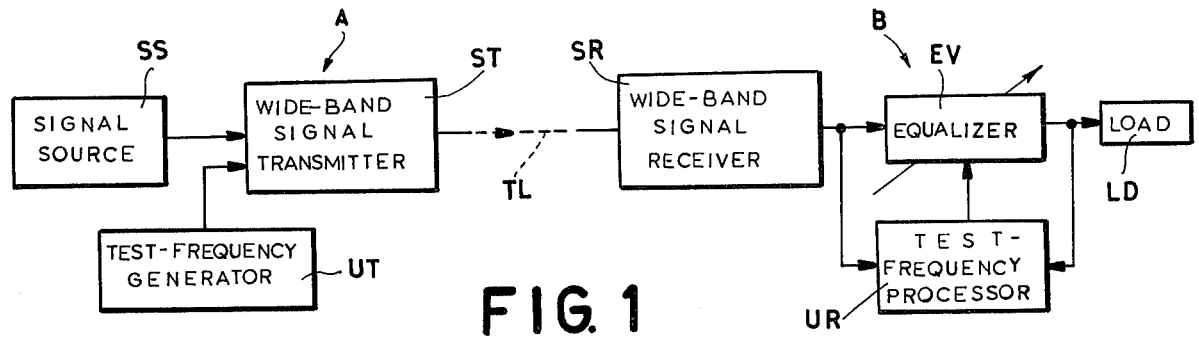
FIG. 1 is a block diagram of part of a telecommunication system embodying my invention, including a one-way branch of a transmission line provided with an equalizer at its receiving end.

In FIG. 1 I have shown a wide-band signal transmitter ST and a corresponding signal receiver SR at opposite ends of a transmission line TL, e.g. a two-wire cable provided with one or more nonillustrated repeaters at intervening locations. Transmitter ST forms part of a terminal A which further includes a signal source SS and a test-frequency generator UT. Receiver SR forms part of a terminal B which further includes an equalizer EV, inserted between that receiver and a load LD, and a test-frequency processor UR complementary to generator UT of the transmitting side. A substantially identical line, e.g. two other wires in the same cable, may be used for conveying signals in the opposite direction, i.e.

from terminal B to terminal A; in that instance, components SS, ST and UT will be duplicated within terminal B whereas components SR, EV and UR will have counterparts in terminal A. The test-frequency generator and the test-frequency processor located in the same terminal could be combined into a single unit.

Figure 2:
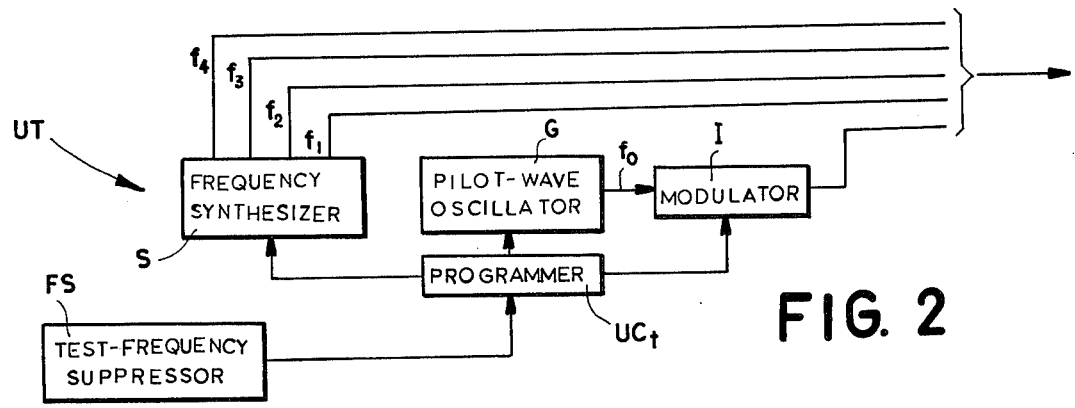
FIG. 2 is a more detailed diagram of a test-frequency generator disposed at the transmitting end of the line shown in FIG. 1.

FIG. 2 shows details of the test-frequency generator UT of FIG. 1. A programmer $UC_t$ controls a frequency synthesizer S, a pilot-wave oscillator G and a modulator I lying in the output of that oscillator. The operating frequency $f_0$ of oscillator G lies below the range of message frequencies to be transmitted via cable TL; synthesizer S, on the other hand, may emit any one of a multiplicity of different test frequencies lying within that range, specifically between sub-bands such as transposed voice channels. Four such test frequencies $f_1$–$f_4$ have been indicated by way of example.

Programmer $UC_t$, when triggered manually or automatically to initiate a test cycle, actuates the oscillator G and the modulator I to send out a start signal in the form of a characteristically coded burst of pilot wave $f_0$; circuit I may modulate that pilot wave in amplitude or pulse width, for example, Substantially simultaneously, programmer $UC_t$ activates the frequency synthesizer S for successive emission of test frequencies $f_1$, $f_2$, $f_3$ and $f_4$ in this order, each such frequency being present on the line TL for a predetermined interval of a programmed sequence. All these frequencies pass by way of transmitter ST and line TL to receiver SR, equalizer EV and processor UR of terminal B (FIG. 1).

Figure 3:
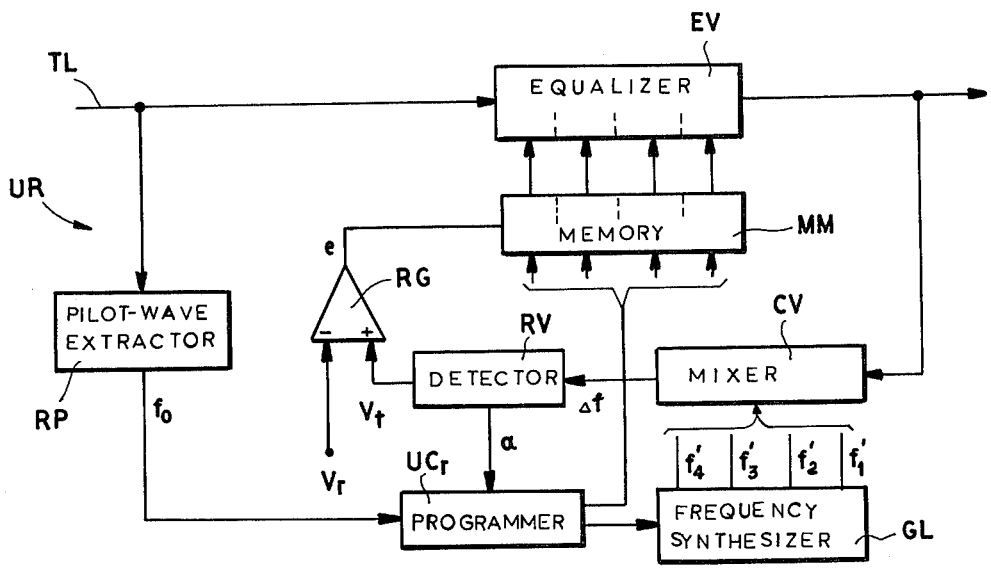
FIG. 3 shows details of a test-frequency processor co-operating with the equalizer of FIG. 1.

Processor UR is shown in FIG. 3 to comprise another programmer $UC_r$ controlling a frequency synthesizer GL which is similar to synthesizer S of FIG. 2 but emits heterodyning frequencies $f_1'$–$f_4'$. These locally generated frequencies are fed to a mixer or frequency converter CV also receiving, from the output of equalizer EV, the test frequency then present on line TL. Each heterodyning frequency $f_1'$, $f_2'$ etc. differs from the respective test frequency $f_1$, $f_2$ etc. by the aforementioned beat frequency $\Delta f$ which appears in the output of mixer CV connected to a detector RV. The latter delivers a test voltage $V_t$, proportional to the amplitude of oscillation $\Delta f$, to one input of a comparator RG whose other input receives a reference voltage $V_r$ of fixed magnitude. Comparator RG produces an error voltage e, representing the difference between voltages $V_t$ and $V_r$, which is fed as a corrective signal to a memory MM having as many cells as there are stages in equalizer EV. Each of these memory cells stores a biasing voltage or other control quantity which is modified by the corrective signal e until the message signals within the frequency band regulated by the associated equalizer stage have the proper level. This occurs when the corresponding test frequency, on which that band is centered, is fed back to mixer CV with such an amplitude that the test voltage $V_t$ practically equals the reference voltage $V_r$ so that the error voltage e substantially disappears. The control quantity stored in the respective memory cell then retains the value to which it was last adjusted. That adjustment, of course, takes place during the interval in which a particular test frequency is present on line TL.

A pilot-wave extractor RP, connected to line TL upstream of equalizer EV in contrast to the input of mixer CV, triggers the programmer $UC_r$ upon detecting the start signal represented by the coded frequency $f_0$. Unit $CR_r$, whose program parallels that of unit $UC_t$ at the transmitting end, thereupon causes the successive emission of the several heterodyning frequencies $f_1'$, $f_2'$, $f_3'$ and $f_4'$ in synchronism with the arrival of the respective test frequencies $f_1$, $f_2$, $f_3$ and $f_4$. Unit $CR_r$ also addresses the memory MM to direct the corrective signal e from comparator RG to that memory cell which works into the evaluator stage assigned to the arriving test frequency.

The several evaluator stages may have the usual bell-type or Gaussian characteristic so that the adjustment of any one stage also affects, albeit to a minor degree, the signal level in adjoining frequency bands. It will therefore be desirable to repeat the described equalization cycle a number of times until the entire signal-frequency range has been properly corrected. Units $UC_t$ and $UC_r$ may be microprocessors programmed to carry out a series of such cycles in immediate succession.

In FIG. 2 I have further illustrated a test-frequency suppressor FS designed to modify the program of processor $UC_t$ whenever one or more of the frequencies generated by the synthesizer S are to be skipped in a test sequence. Suppressor FS may include a set of manually operable selector switches, for example, whose operation short-circuits certain phases of the program with elimination of the intervals allotted to the emission of the unwanted frequencies. Let us assume, for example, that the interstitial zones containing test frequencies $f_2$ and $f_3$ are temporarily used for the transmission of video signals over line TL so that the synthesizer S is directed to generate the frequency $f_4$ immediately after terminating the emission of frequency $f_1$. In the processor UR of FIG. 3, the first phase of the program proceeds normally as mixer CV receives the test frequency $f_1$ from equalizer EV for the requisite length of time. Programmer $UC_r$ then switches the synthesizer GL from frequency $f_1'$ to frequency $f_2'$. Since, however, the associated test frequency $f_2$ is not fed for a prolonged period to mixer CV, detector RV does not receive a sustained beat-frequency oscillation $\Delta f$ and communicates this fact to programmer $UC_r$ in the form of an alarm signal a. Programmer $UC_r$ thereupon immediately switches the synthesizer GL to its next frequency $f_3'$, with a similar result. A further switchover to frequency $f_4'$, however, re-establishes the beat frequency $\Delta f$ in the output of mixer CV inasmuch as the corresponding test frequency $f_4$ arrives over the line TL at the same time.

If the assemblies of FIGS. 2 and 3 are respectively duplicated in terminals B and A for the transmission of signals in the opposite direction, the transmitting programmer $UC_t$ may turn on the receiving programmer in terminal A while the receiving programmer $UC_r$ triggered by pilot-wave extractor RP starts the transmitting programmer in terminal B. This eliminates the need for a second pilot-wave oscillator, modulator and extractor. A signal frequency synthesizer in each terminal may generate both the outgoing test frequencies and the locally utilized heterodyning frequencies.

I claim:

1. In a telecommunication system comprising a transmission line, a transmitter of wide-band message signals at one end of said line and a receiver for said message signals at the other end of said line, said message signals lying in a frequency range divided into a multiplicity of sub-bands separated from one another, the combination therewith of a first oscillation generator at said one end adapted to produce a succession of test frequencies lying between said sub-bands, first programming means at said one end for actuating said first oscillation generator to emit said test frequencies over said line in a predetermined sequence, an equalizer at said other end divided into a plurality of stages individually adjustable to correct the level of incoming signals in respective frequency bands centered on said test frequencies, a second oscillation generator at said other end adapted to produce a succession of heterodyning frequencies each differing from a respective test frequency by a predetermined beat frequency, mixer means at said other end connected to receive said test frequencies from said line at a point downstream of said equalizer and said heterodyning frequencies from said second oscillation generator, second programming means at said other end synchronizable with said first programming means for actuating said second oscillation generator to produce said heterodyning frequencies concurrently with the arrival of the respective test frequencies whereby said beat frequency appears in the output of said mixer means, detector means connected to said output for producing a test signal proportional to the amplitude of said beat frequency, comparison means connected to said detector means and to a source of reference signal for generating a corrective signal, feedback means controlled by said second programming means for directing said corrective signal to the equalizer stage associated with the test frequency giving rise to said beat frequency, and suppressor means at said one end for selectively modifying the operation of said first programming means to skip certain of said test frequencies in said predetermined sequence, said second programming means being controlled by said detector means to modify said succession of heterodyning frequencies in substantial conformity with the sequence of arriving test frequencies.

2. The combination defined in claim 1 wherein said feedback means includes a memory with a plurality of cells each storing a control quantity for a respective equalizer stage, said cells being sequentially activable by said second programming means to receive the corresponding corrective signals for modifying the stored control quantity.

3. The combination defined in claim 1, further comprising signal-emitting means at said one end actuatable by said first programming means to send a start signal over said line at the beginning of said sequence of test frequencies, and signal-extraction means at said other end responsive to the arrival of said start signal over said line for triggering said second programming means into initiating the generation of said succession of heterodyning frequencies.

4. In a telecommunication system comprising a transmission line, a transmitter of wide-band message signals at one end of said line and a receiver for said message signals at the other end of said line, said message signals lying in a frequency range divided into a multiplicity of sub-bands separated from one another;

the combination therewith of:

a first oscillation generator at said one end adapted to produce a succession of test frequencies lying between said sub-bands;

first programming means at said one end for actuating said first oscillation generator to emit said test frequencies over said line in a predetermined sequence;

an equalizer at said other end divided into a plurality of stages individually adjustable to correct the level of incoming signals in respective frequency bands centered on said test frequencies;

a second oscillation generator at said other end adapted to produce a succession of heterodyning frequencies each differing from a respective test frequency by a predetermined beat frequency;

mixer means at said other end connected to receive said test frequencies from said line at a point downstream of said equalizer and said heterodyning frequencies from said second oscillation generator;

second programming means at said other end synchronizable with said first programming means for actuating said second oscillation generator to produce said heterodyning frequencies concurrently with the arrival of the respective test frequencies whereby said beat frequency appears in the output of said mixer means;

detector means connected to said output for producing a test signal proportional to the amplitude of said beat frequency;

comparison means connected to said detector means to a source of reference signal for generating a corrective signal;

feedback means controlled by said second programming means for directing said corrective signal to the equalizer stage associated with the test frequency giving rise to said beat frequency, said feedback means including a memory with a plurality of cells each storing a control quantity for a respective equalizer stage, said cells being sequentially activable by said second programming means to receive the corresponding corrective signals for modifying the stored control quantity;

signal-emitting means at said one end actuatable by said first programming means to send a start signal over said line at the beginning of said sequence of test frequencies; and signal-extraction means at said other end responsive to the arrival of said start signal over said line for triggering said second programming means into initiating the generation of said succession of heterodyning frequencies.

5. The combination defined in claim 3 or 4 wherein said signal-emitting means comprises a pilot-wave oscillator with an operating frequency lying outside said frequency range.

6. The combination defined in claim 5 wherein said signal-emitting means further comprises modulating means for distinctively coding the pilot wave generated by said oscillator.

* * * * *